United States Patent
Visalli et al.

(10) Patent No.: US 7,929,643 B2
(45) Date of Patent: Apr. 19, 2011

(54) METHOD OF ESTIMATING FADING COEFFICIENTS OF CHANNELS AND OF RECEIVING SYMBOLS AND RELATIVE SINGLE OR MULTI-ANTENNA RECEIVER AND TRANSMITTER

(75) Inventors: Giuseppe Visalli, Messina (IT); Giuseppe Avellone, Palermo (IT)

(73) Assignee: STMicroelectronics S.R.L., Agrate Brianza (MI) (IT)

( * ) Notice: Subject to any disclaimer, the term of this patent is extended or adjusted under 35 U.S.C. 154(b) by 0 days.

(21) Appl. No.: 12/622,054

(22) Filed: Nov. 19, 2009

(65) Prior Publication Data
US 2010/0135435 A1 Jun. 3, 2010

Related U.S. Application Data

(62) Division of application No. 11/287,112, filed on Nov. 23, 2005, now Pat. No. 7,643,588.

(30) Foreign Application Priority Data

Nov. 23, 2004 (IT) .............................. VA2004A0054

(51) Int. Cl.
*H04L 27/00* (2006.01)
(52) U.S. Cl. ........ 375/324; 375/348; 375/329; 375/316; 375/346

(58) Field of Classification Search .................. 375/316, 375/329, 324, 348, 346
See application file for complete search history.

(56) References Cited

U.S. PATENT DOCUMENTS

| | | | | |
|---|---|---|---|---|
| 6,201,799 B1 * | 3/2001 | Huang et al. | .................. | 370/342 |
| 6,504,884 B1 * | 1/2003 | Zvonar | .......................... | 375/346 |
| 7,251,291 B1 * | 7/2007 | Dubuc et al. | .................. | 375/296 |

* cited by examiner

*Primary Examiner* — Ted M Wang
(74) *Attorney, Agent, or Firm* — Lisa K. Jorgenson; Allen, Dyer, Doppelt, Milbrath & Gilchrist, P.A.

(57) ABSTRACT

The method is for estimating the fading coefficients of a plurality of transmission channels on which signals to be sent, generated as a function of a sequence of symbols, are transmitted according to a particular modulation, e.g. AM-PSK modulation. The fading coefficients are estimated by using estimations of the transmitted symbols obtained in advance, thus obtaining DC components of the received signal by coherent demodulation locked to the phases of the transmitted AM-PSK signals, and processing these DC components. The method may not require the choice of a stochastic distribution model of the channel fading, thus it remains efficient even when the channel characteristics vary significantly. Moreover, the method works correctly even if the received stream is disturbed by inter-symbolic interference (ISI) and/or by multi-path fading.

11 Claims, 15 Drawing Sheets

UNIT 8000

METHOD OF ESTIMATING FADING COEFFICIENTS OF CHANNELS AND OF RECEIVING SYMBOLS AND RELATIVE SINGLE OR MULTI-ANTENNA RECEIVER AND TRANSMITTER

RELATED APPLICATION

This application is a divisional of Ser. No. 11/287,112 filed Nov. 23, 2005 now U.S. Pat. No. 7,643,588, the entire disclosure of which is hereby incorporated herein by reference.

FIELD OF THE INVENTION

The present invention relates in general to the transmission of digital signals and more particularly to methods for estimating fading coefficients of channels for transmitting and receiving symbols and to related architectures of transmitters and receivers with a single antenna or multi-antennas.

BACKGROUND OF THE INVENTION

Estimating characteristics of a transmission channel is a particularly important task in the field of wireless communications, for producing receivers of digital signals characterized by a small probability of incorrect recognition of transmitted symbols. Typically, in wireless communications the transmitted signals fade according to a time-variable fading coefficient that must be estimated for correctly recognizing transmitted symbols. For this reason receivers that use the so-called "channel estimators" have been produced.

According to a known technique, certain channel estimator algorithms contemplate the step of sending a pre-established sequence of known symbols to the receiver, commonly called a "training sequence", on the transmission channel the characteristics of which need to be estimated. The relative fading coefficient is estimated in function of the received signal.

Known receivers have a quite complex hardware for estimating the channel characteristics. They commonly use Kalman filters and determine fading coefficients using a relatively long "training sequence". Kalman filters have drawbacks because they introduce a significant delay in the estimation of the fading coefficients, thus these receivers require a faster system of estimation of the channel characteristics.

FIG. 1 shows a typical "channel estimating algorithm" disclosed in Grant "Joint Decoding and Channel Estimation for Space-Time Codes". The demodulator tracks the channel, that is it adapts itself to the varying characteristics of the channel. This operation is very important in communications implementing the so-called "transmit diversity" technique disclosed in S. M. Alamouti "A simple Transmit Diversity Technique for Wireless Communications." IEEE Journal on Select Areas in Communications, Vol. 16 No. 8 October 1998.

According to the "transmit diversity" technique, a time correlation among symbols transmitted with a plurality of antennas is introduced. Each antenna transmits on a transmission channel with fading characteristics that in general differ from those of the transmission channel of any other antenna. To correctly receive the transmitted signals, it is not possible to ignore the different fading coefficients of the channels in use, if satisfactory performances are to be obtained. Indeed, the fading coefficient of each channel may vary with time especially if the receiver is moving and/or the transmission is at high bit-rate. To better illustrate the problem, the "transmit diversity" technique is briefly discussed below.

TRANSMIT DIVERSITY. Noise is always supposed to be Gaussian in designing digital receivers. According to this hypothesis, the bit-error rate (BER) is supposed to be reduced by $10^{-3}$ to $10^{-4}$ s, thus increasing the signal-to-noise ratio of 2 or 3 dB. Actually, because of the so-called "multi-path fading" phenomenon, it is necessary to increase the signal-to-noise ratio of about 10 dB for reducing the BER from $10^{-3}$ to $10^{-4}$.

The "transmit diversity" technique allows a reduction of the minimum signal-to-noise ratio of the received signals necessary for having a satisfactory BER. Alamouti demonstrated that a system with two transmitting antennas and a receiving antenna has the same yield of a receiver, shown in FIG. 2, with two antennas. The receiver proposed by Alamouti, shown in FIG. 3, has the same performances with the same "data rate" of the receiver of FIG. 2.

More particularly, Alamouti proposed to transmit symbols $s_0$ and $s_1$ with two different antennas according to the following rule $$\begin{bmatrix} s_0 & s_1 \\ -s_1^* & s_0^* \end{bmatrix}$$

wherein the symbol at row n and column j is to be transmitted during the n-th symbol interval by the j-th antenna. The asterisk indicates the complex conjugate of the symbol. In practice, according to the technique disclosed in Almouti, the symbols $s_0$ and $s_1$ are transmitted in the first symbol interval by the first and by the second antenna, respectively, while in the second symbol interval the pair of symbols $-s_1^*, s_0^*$ are transmitted by the first and by the second antenna, respectively.

The receiver has only one antenna. The two channels fade the transmitted signals according to the coefficients $h_0$ and $h_1$, thus the following signal r is received:

$$r = h_0 \cdot s_0 + h_1 \cdot s_1 + n_0$$

The receiver detects and decodes the symbols by processing the received signal with a maximum likelihood algorithm, for two consecutive symbol intervals.

The fading coefficients of the transmission channels have a module and a phase:

$$h_0 = \alpha_0 \cdot e^{i\theta_0} \quad h_1 = \alpha_1 \cdot e^{i\theta_1}$$

wherein i is the imaginary unit.

According to a simple model, the modules of these fading coefficients are stochastic variables with a Rayleigh distribution, while the phases are uniformly distributed in the interval $[0, 2\pi]$. An ideal receiver provides an estimation of the fading coefficients $h_0$ and $h_1$ and it functions correctly if this estimation is exact. The fact that the module of the fading coefficient of a channel is a stochastic variable with a Rayleigh distribution is only one of the possible mathematical models that may be adopted. According to other authors, these modules must be modeled as stochastic variables with a Rice or Jakes distribution. If the transmission channel presents characteristics different from the ideal characteristics of the chosen stochastic distribution, the bit-error rate of the receiver could be not satisfactory.

U.S. Pat. No. 6,603,823 discloses a "channel estimator" that is quite complex and slow and that processes values of received data with a priori determined probabilities only on the received symbols. U.S. Pat. No. 5,838,739 discloses a classic correlation estimator. The system needs a sequence of synchronization symbols. The received signal is oversampled and compared (through "correlation blocks") with certain sequences (DATA WORD) that strongly depends on the mathematical model of the channel, that is they depend on its statistic figure.

U.S. Pat. No. 6,327,314 discloses a "channel estimator" based on time and frequency correlations of the frequency responses of the transmission channels. U.S. Pat. No. 6,269, 131 discloses an adaptive equalizer that implements the minimum squares algorithm. It needs test symbols and a processing unit. U.S. Pat. No. 5,737,327 discloses a "channel estimator" for CDMA based on the use of a pilot channel for estimating the phase and the fading of the transmission channel. U.S. Pat. No. 5,712,877 discloses a device for transmitting and receiving digital information by inserting "training sequences" or pilot symbols inside a data stream transmitted in CPM. This implies that the pilot symbols depend on the previously transmitted data according to the coding rule used for the CPM. Channel estimation is carried out with an iterative method that improves this estimation, based on the transmitted pilot symbols, at each iteration.

U.S. Pat. No. 5,272,727 discloses an adaptive decoder that estimated the characteristics of the transmission channel for obtaining a sequence of transmitted symbols by processing a received signal. The estimation of the channel fading is updated in function of the error signal and a LMS algorithm. This error signal is obtained by comparing a properly delayed (i.e. stored) replica of the sequence of samples with a signal obtained by convolution of the estimated sequence of data from the MLSE (depending on the same samples) with the pulse response estimated at the previous step. Depending on this comparison it is decided whether repeating the operation of data decoding using the new channel estimation or not.

U.S. Pat. No. 5,303,263 discloses an equalizer comprising a "channel estimator" having a processor that implements the Viterbi algorithm for estimating accurately the transmitted symbols. It uses a RLS algorithm for updating the channel coefficients. An error signal is generated by comparing the stored sequence of samples with the signal obtained by convolution between the current estimation of the pulse channel response and the relative sequence of data estimated by the decoder.

European patent EP 369 406 discloses a PSK demodulator in which the received PSK signal is phase-locked by means of an algorithm for maximizing the signal-to-noise ratio or minimizing the bit-error rate. European patent EP 317 127 discloses a time-varying "trellis-code" modulation technique and a related device that allows PSK transmissions with high performances, in particular for radio transmissions. European patent application No. 03425662.8 (EP 1 542 772) in the name of the same Assignee discloses a process and a relative system for decoding signals comprising symbols coded in respective symbol intervals that modulate a carrier, very easy to be realized and not computationally onerous.

Other pertinent background references include: Kang M. P. Fitz and S. B. Gelfand, "Blind Estimation of Multi-path Channel Parameters: A Modal Analysis Approach" IEEE Transaction on Communications Vol. 47 No. 8 1999; G. J. Foschini and M. J. Gans "On Limits of Wireless Communications in a Fading Environment when Using Multiple Antennas" Wireless Personal Communications© 1998 Kluwer Academic Publishers; P. Alexander and A. Grant "Iterative Decoding and Channel Estimation" ISIT Sorrento June 2000; C. Tellambura, M. G. Parker, Y. Jay Guo, Simon J. Shepherd, and Stephen K. Barton "Optimal Sequences for Channel Estimation Using Discrete Fourier Transform Techniques IEEE Transaction On communications, Vol. 47, No. 2, 1999; Komninakis, C. Fragouli, A. H. Sayed, R. D. Wesel, "Channel estimation and equalization in fading"; U.S. Pat. No. 6,603, 823, "Channel Estimator", in the name of Intel Corporation; J. G. Proakis, "Digital Communication", Third Edition, McGraw-Hill Int. Ed; S. Bendetto, E. Biglieri, V. Castellani "Digital Transmission Theory"; and B. Vucetic, J. Yuan, "Space-Time Coding", Wiley.

SUMMARY OF THE INVENTION

The present invention provides a method for estimating the fading coefficients of a plurality of transmission channels on which signals to be sent, generated as a function of a sequence of symbols, are transmitted according to a particular modulation, Amplitude Modulation/Phase Shift Keyed (AM-PSK), hereinafter referred to as AM-PSK. This type of modulation has already been disclosed in the above cited European patent application No. 03425662.8 (EP 1 542 772) and will be illustrated hereinafter.

According to this invention, the fading coefficients are estimated by using estimations of the transmitted symbols obtained in advance with any technique, thus obtaining DC components of the received signal by coherent demodulation locked to the phases of the transmitted AM-PSK signals, and processing these DC components. The method of this invention may be implemented without requiring the choice of a stochastic distribution model of the channel fading, thus it remains efficient even when the channel characteristics vary significantly. Moreover, it works correctly even if the received stream is disturbed by inter-symbolic interference (ISI) and/or by multi-path fading.

According to a preferred embodiment, a sequence of known symbols ("training sequence") is sent to the receiver and the fading coefficients of the used channels are estimated in function of the received signal. The method of the invention may be implemented even with AM-PSK signals transmitted or received through a plurality of distinct antennas. Also in this case, the method allows to calculate the fading coefficients by solving a system of linear equations without implementing onerous maximum likelihood recognition algorithms.

This invention further provides a method for receiving symbols transmitted on at least two transmission channels through AM-PSK signals that exploits the method of the invention for estimating fading coefficients of the channels. A receiver and a transmitter implementing the methods of the invention are also provided. An aspect of the invention also includes the use of a program for a computer loadable in a memory of the computer, such as a computer readable medium, and includes software code or instructions for controlling the estimation of fading coefficients of a plurality of transmission channels as described in the method.

BRIEF DESCRIPTION OF THE DRAWINGS

The invention will be described referring to the attached drawings, wherein.

DETAILED DESCRIPTION OF THE PREFERRED EMBODIMENTS

Figure 1:
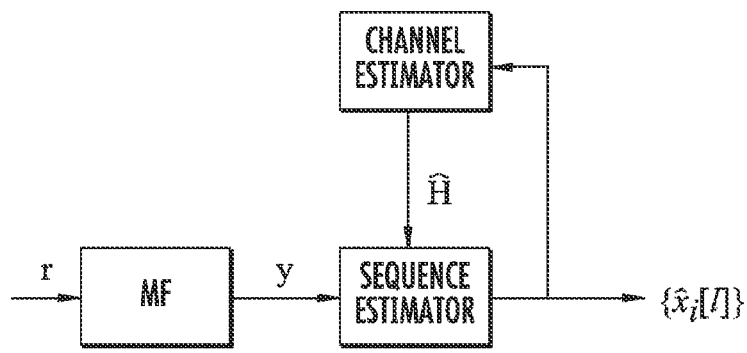
FIG. 1 is a schematic diagram illustrating the "channel estimator" according to the prior art (Grant)
Figure 2:
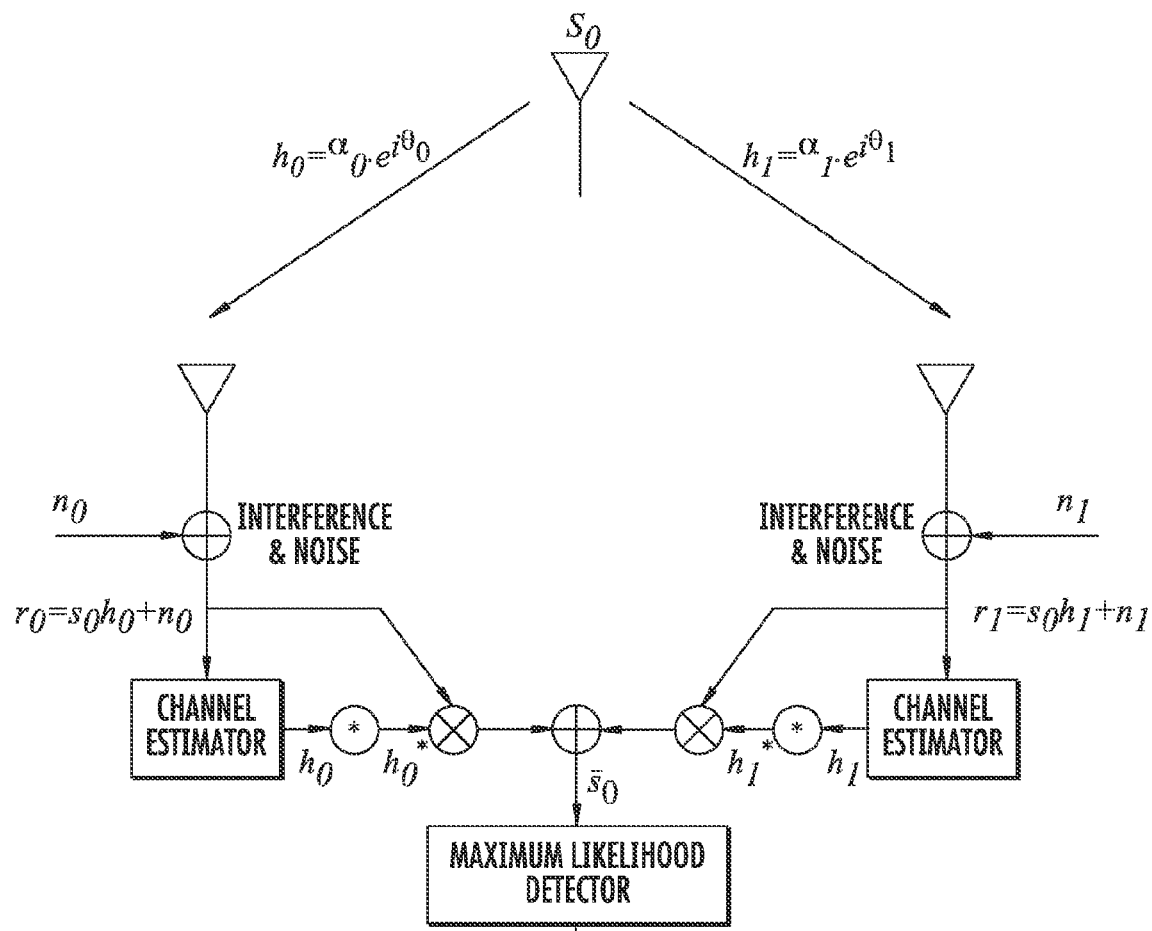
FIG. 2 is a schematic diagram illustrating a known receiver and "channel estimator" with two antennas.
Figure 3:
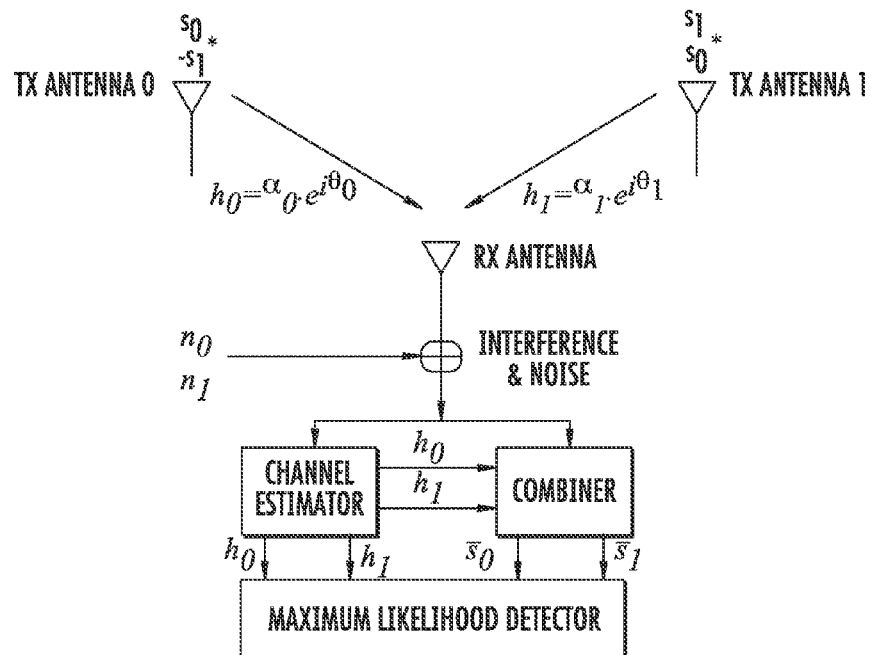
FIG. 3 is a schematic diagram illustrating the receiver and "channel estimator" according to the prior art (Alamouti)
Figure 5:
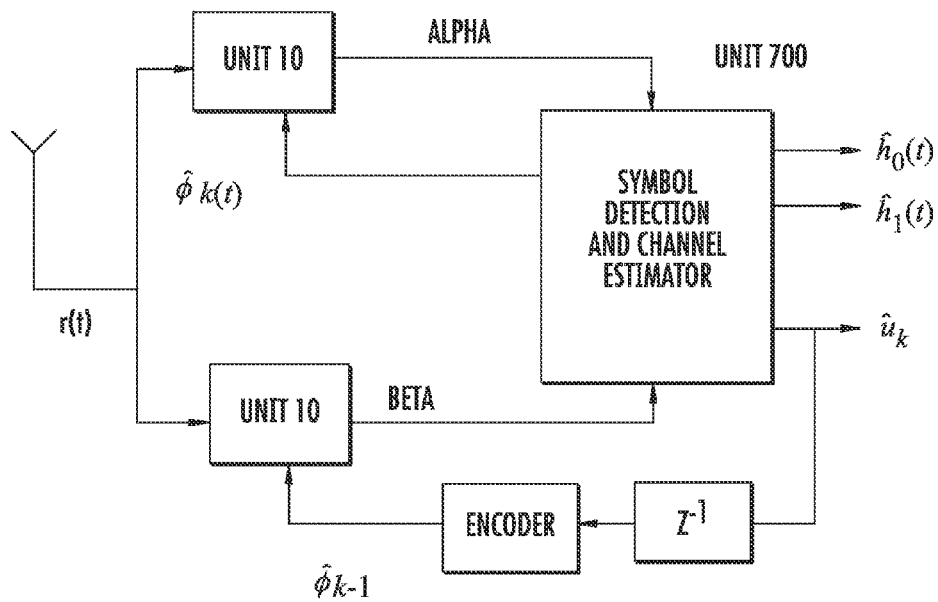
FIG. 5 is a schematic diagram illustrating a receiver and "channel estimator" of the present invention for receiving symbols transmitted by the transmitter of FIG. 4.

The method of this invention is applicable with Amplitude Modulation/Phase Shift Keyed (AM-PSK) modulated signals. The source symbols $u_k$ to be transmitted may be +1 or −1, or they may be chosen in a more numerous set. For ease of understanding, consider the case in which $$u_k \in \{-1,+1\} \quad (1)$$

In the ensuing description it will be shown how to generalize the invention to the case in which the symbols to be transmitted are identified by two or more bits.

A generic AM-PSK modulated signal is described by the following equation $$s(t) = u_k \cdot \cos(2\pi f_0 t + \phi_k) \quad (2)$$

The symbol $u_k$ to be transmitted is preferably encoded by a "convolutional encoder", for instance of the kind disclosed in the book "Digital Communications" by Proakis, third edition. Depending on the symbol $u_k$, a code word $c_k$ is generated, to which a phase $\phi_k$ is associated according to the known techniques in PSK transmissions. If no more than four different symbols are used, the phase $\phi_k$ is determined according to the following formula:

$$\phi_k = c_k \cdot \frac{\pi}{2} \quad (3)$$

According to the "transmit diversity" technique, the signal s(t) is combined with a delayed replica thereof s(t−T). Let us consider the case in which the delay T is equal to a symbol period of the AM-PSK transmission, that is it satisfies the following equation:

$$2 \cdot \pi \cdot f_0 \cdot T = k \cdot \frac{\pi}{2} \quad (4)$$

As a consequence, the received signal r(t) is given by the following equation:

$$r(t) = h_0 \cdot u_k \cdot \cos(2\pi f_0 t + \phi_k) + h_1 \cdot u_{k-1} \cdot \cos(2\pi f_0 t + \phi_{k-1}) + n(t) \quad (5)$$

being n(t) the additive noise generated by the two transmission channels.

In the following description an embodiment of the invention is described referring to the case in which the signal r(t) is given by the superposition of two AM-PSK signals, as shown in the previous formula, but what will be stated is applicable, with the necessary changes, also when more than two transmitting antennas and more than a receiving antenna are present, and the symbols may assume more than four different values.

Figure 4:
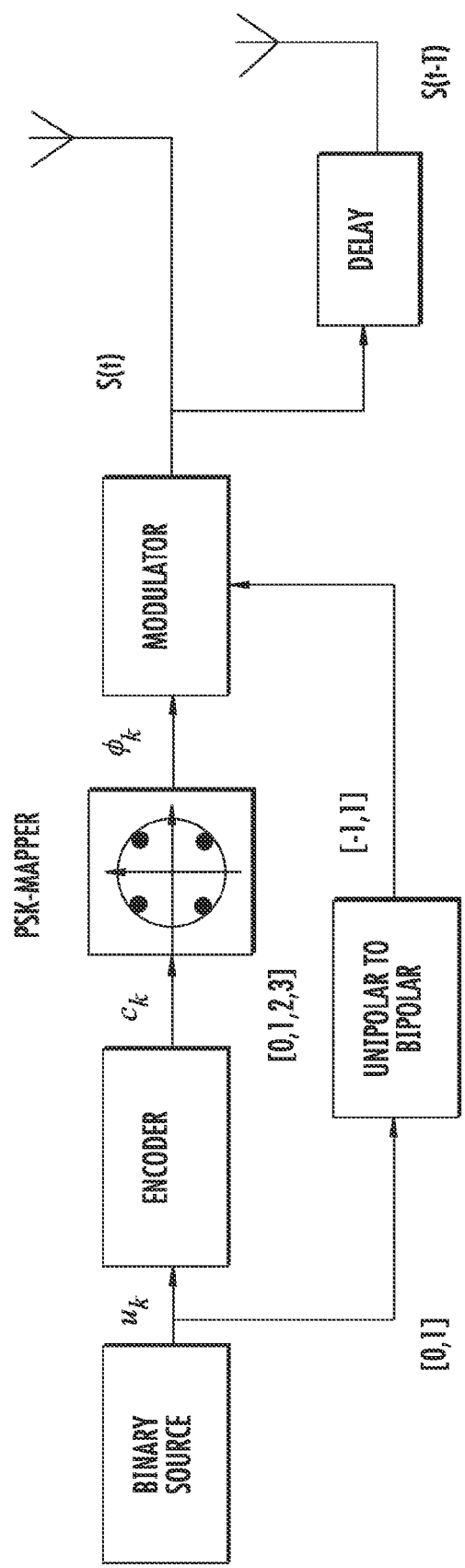
FIG. 4 is a schematic diagram illustrating a transmitter of the invention with a plurality of antennas.

FIG. 4 shows a transmitter of the invention with two antennas. According to a known technique, a source of symbols BINARY SOURCE provides the symbols to be transmitted to an encoder ENCODER that generates a code word $c_k$ preferably implementing a convolutional code. The block PSK-MAPPER, commonly indicated as the "PSK-mapper" circuit in the field of PSK modulation, associates a phase $\phi_k$ to the code word $c_k$. Then the modulator MODULATOR generates the signal s(t), transmitted by a first antenna, according to Eq. (2). The transmitter of the invention has at least a second antenna that transmits a delayed replica of the signal s(t) of a symbol period T via a delay line DELAY. As will be shown hereinafter, by doing so it is possible to relevantly improve the efficiency of the transmission.

Figure 8:
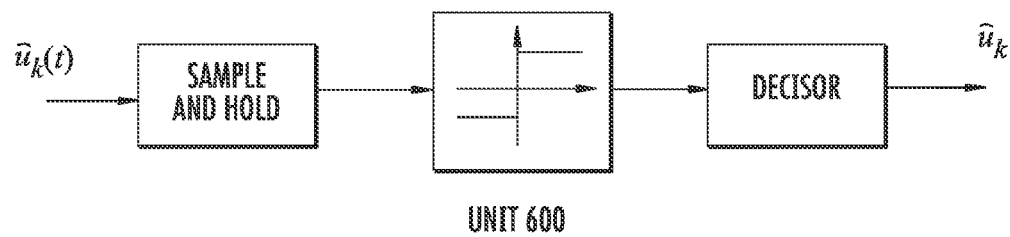
Figure 9:
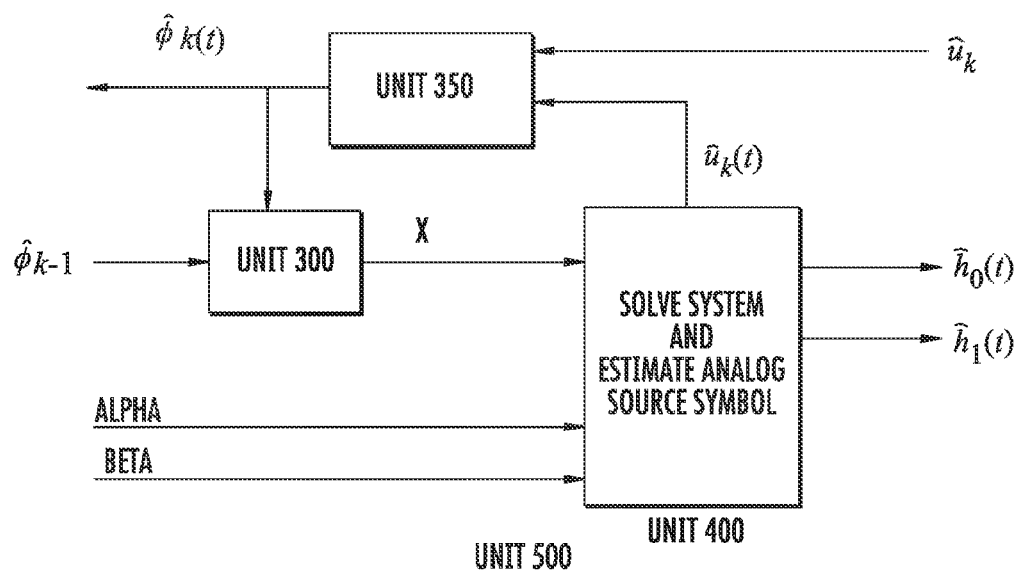

A scheme of a receiver and "channel estimator" of the invention is shown in FIG. 8, for the case in which there are two transmitting antennas and a sole receiving antenna and the signal r(t) is as defined in Eq. (5). The receiver generates the DC components alpha and beta by the received signal via coherent demodulation locked to the two phases of the symbols $u_k$ and $u_{k-1}$.

More precisely, during the symbol period T of the current symbol $u_k$, the block UNIT 700 generates a signal $\hat{\phi}_k(t)$ that approximates the phase $\phi_k$ of the AM-PSK signal that transmits a current symbol $u_k$. This signal is used by the demodulator UNIT 10 for generating a first DC component alpha and another DC component beta by using the phase estimation $\hat{\phi}_{k-1}$ associated to the previously received symbol. The phase $\phi_{k-1}$ is generated internally by the decoder of the invention by encoding, with the block ENCODER, the symbol previously estimated by the block UNIT 700. This block ENCODER is identical to that of the transmitter of FIG. 4.

It is worth remarking that the previously estimated signal $\hat{\phi}_{k-1}$ is constant during the whole symbol period because it is a signal that represents a digital value generated starting from an estimation of the previously received symbol. By contrast, the signal $\hat{\phi}_k(t)$ may vary during a same symbol period. It approximates the phase associated to the current symbol, generated in an analog manner in function of the variable values of the DC components alpha and beta and on the estimated analog values $\hat{h}_0(t)$ and $\hat{h}_1(t)$ of the fading coefficients of the used channels. At the end of the symbol period, a digital estimation $\hat{u}_k$ of the received symbol is generated.

Figure 6:
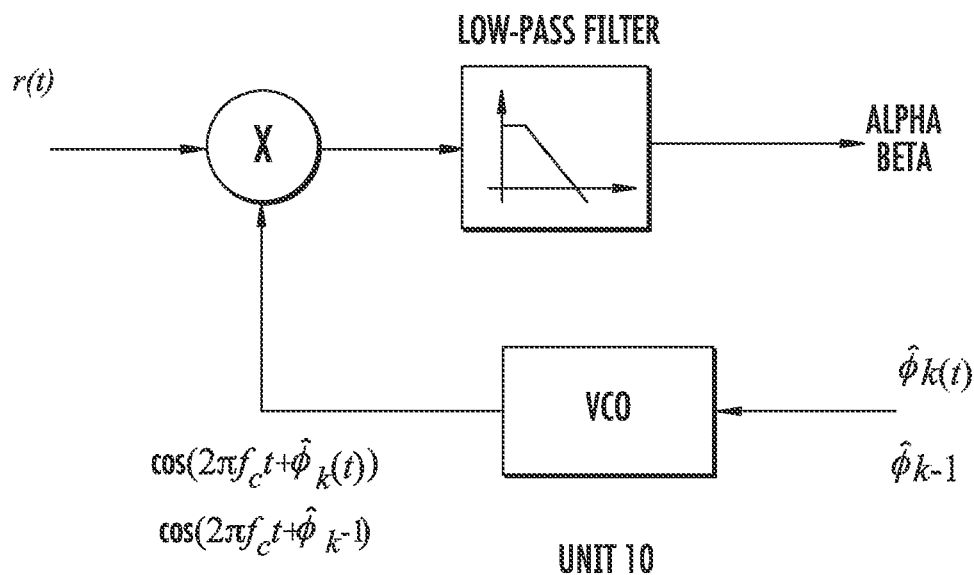
FIG. 6 is a schematic diagram illustrating the preferred embodiment of the block UNIT 10 of FIG. 5.

The demodulators UNIT 10 may be realized according to the scheme depicted in FIG. 6, wherein a voltage controlled oscillator VCO generates a carrier with a desired frequency and initial phase. The functioning of the coherent demodulator of FIG. 6 will be evident to a skilled person and will not explained. Of course, the block UNIT 10 could be realized according to any architecture that allows to extract, with a coherent demodulation locked to the input phase, the DC component alpha (or beta) starting from the received signal r(t).

FIGS. 7, 9, 10 and 11 show the various functional blocks of the receiver and "channel estimator" of the invention. The block UNIT 700 comprises a block UNIT 600 that samples repeatedly the approximation signal $\hat{u}_k(t)$ of the current symbol (the signal is variable in the symbol period), quantizes it to the values +1 and −1 and decides, through the block DECISOR, which symbol has been transmitted basing on the values of the detected samples. For instance, this may be done by outputting the value that has been detected the largest number of times.

The block CONVOLUTIONAL ENCODER generates a variable signal $\hat{\phi}_k(t)$ in a symbol period that approximates the phase associated to the current symbol $u_k$ according to a rule identical to that used by the block ENCODER and by the circuit "PSK-mapper" embodied in the transmitter.

Figure 11:
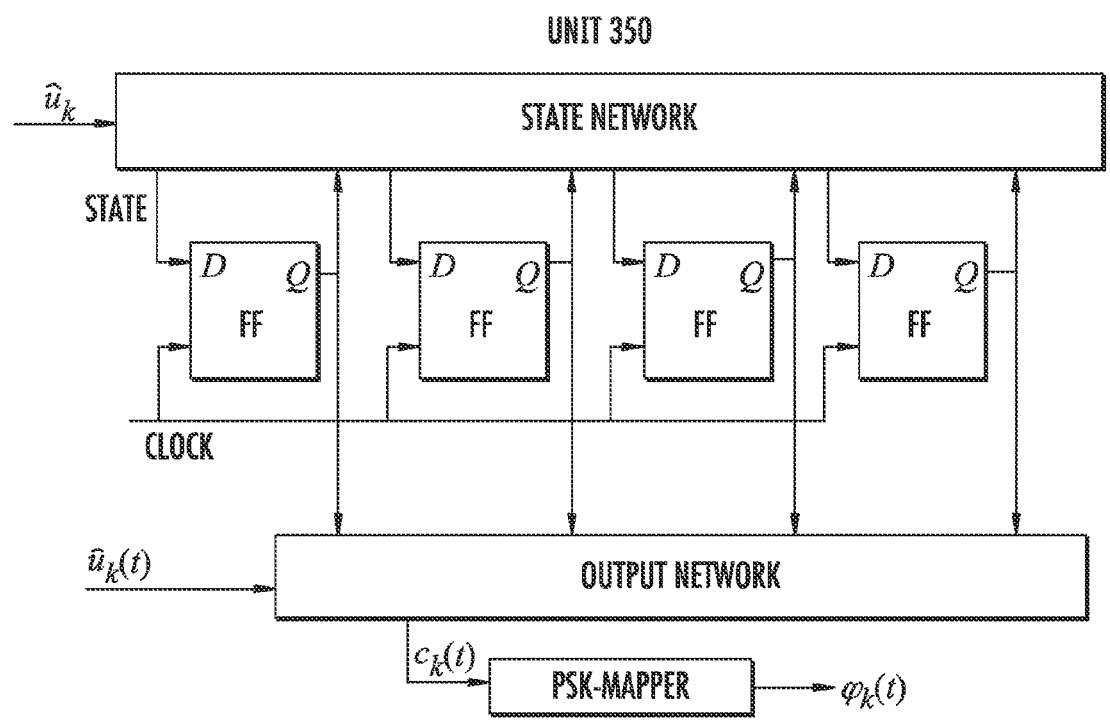
FIG. 11 is a schematic diagram illustrating a convolutional encoding block with a network that generates an internal signal STATE and a network that generates an analog signal that approximates the phase associated to a current symbol.

According to a preferred embodiment of the invention, it is realized as shown in FIG. 11, with an output combinatory network (that is composed only of logic gates and not by latches) OUTPUT NETWORK and a circuit "PKS-mapper" that generates the signal $\hat{\phi}_k(t)$ in function of the approximation signal $\hat{u}_k(t)$ of the current symbol and of an internal vector state stored in a bank of flip-flops, and a state combinatory network STATE NETWORK that generates the internal vector state in function of the estimated value $\hat{u}_k$ of the correctly received symbol, obtained by sampling the approximation signal $\hat{u}_k(t)$.

The block UNIT 350 of FIG. 11 is, a convolutional encoder that has a state combinatory network STATE NETWORK, that generates a vector of digital values STATE stored in the bank of flip-flops of the encoder, and a combinatory network OUTPUT NETWORK, that exploits these digital values for generating code words. Differently from a classic encoder, the combinatory network OUTPUT NETWORK is input with the approximation variable signal $\hat{u}_k(t)$ of the current symbol, while the network STATE NETWORK is input with the corresponding digital value.

To make the combinatory network OUTPUT NETWORK capable of elaborating a signal that varies during a same symbol period, it must be realized with sufficiently fast logic gates such to generate a stable output after a switching of the signal $\hat{u}_k(t)$ before another switching takes place. A detailed description of the functioning of the receiver and "channel estimator" of the invention is now described.

The DC components alpha and beta are given by the following equations:

$$\text{beta} = h_0 \cdot u_k \cdot \cos(\hat{\phi}_{k-1} - \phi_k) + h_1 \cdot u_{k-1} \cdot \cos(\hat{\phi}_{k-1} - \phi_{k-1}) \tag{6}$$

wherein for ease of understanding the noise term n(t) that corrupts the received signal has not been considered, and it has been considered that the component at a frequency double than the frequency of the VCO, generated by the multiplier of FIG. 6, has been filtered away by the low-pass filter in cascade thereto.

In the hypothesis that the two different phases of the received signal have been locked, that is:

$$\begin{cases} \hat{\phi}_k(t) = \phi_k \\ \hat{\phi}_{k-1} = \phi_{k-1} \end{cases} \tag{7}$$

the following equations hold $$\text{alpha} = h_0 \cdot u_k + h_1 \cdot u_{k-1} \cdot x$$

$$\text{beta} = h_0 \cdot u_k \cdot x + h_1 \cdot u_{k-1} \tag{8}$$

being $$x = \cos(\hat{\phi}_k(t) - \hat{\phi}_{k-1}) \tag{9}$$

The previous system of equations must be non-singular to be solved. This may be obtained by making the phases $\phi_k$ and $\phi_{k-1}$ one different from the other, for instance by using at the transmitter an encoder ENCODER, preferably a convolutional encoder generating code words such that a same phase is not repeated two consecutively times.

Figure 10:
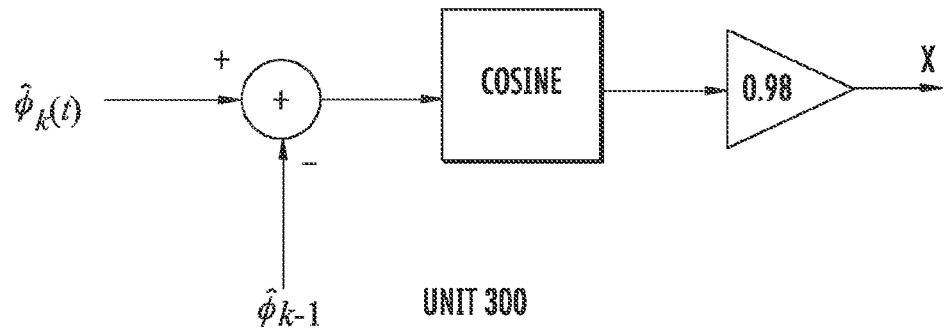

Optionally, it is possible to use also the so-called "Turbo" codes and in general codes with or without memory. As an alternative, it is possible to generate the signal x as shown in FIG. 10. In practice, the cosine of the difference between the two phases is scaled by a factor near to one, for instance 0.98:

$$x = 0.98 \cos(\hat{\phi}_k(t) - \hat{\phi}_{k-1}) \tag{10}$$

The block UNIT 400 calculates the fading coefficients and the approximation signal $\hat{u}_k(t)$ in function of the two DC components alpha and beta and of the signal x, by solving the following equations:

$$\begin{cases} h_1 \cdot u_{k-1} = \dfrac{\text{beta} - \text{alpha} \cdot x}{1 - x^2} \\ h_0 \cdot u_k = \dfrac{\text{alpha} - \text{beta} \cdot x}{1 - x^2} \end{cases} \tag{11}$$

According to an embodiment of the invention, a "training sequence" is transmitted, that is a pre-established sequence of symbols known to the receiver, and these symbols are used for obtaining a first estimation of the fading coefficients of the two channels. Then symbols unknown a priori are transmitted to the receiver. As an alternative, it is possible to use any estimation of the transmitted symbols, independently on how it has been obtained. By using the estimation $\hat{u}_{k-1}$ of the previously transmitted symbol, the block UNIT 400 calculates a new fading coefficient for the second transmission channel:

$$h_1 = \dfrac{\text{beta} - \text{alpha} \cdot x}{(1 - x^2) \cdot \hat{u}_{k-1}} \tag{12}$$

According to the preferred embodiment of the method of the invention, it is supposed that the sign of the fading coefficient of the first channel is unchanged and its module is calculated with the following equation:

$$|h_0| = \left| \dfrac{\text{alpha} - \text{beta} \cdot x}{1 - x^2} \right| \tag{13}$$

The analog approximation signal $\hat{u}_k(t)$ is generated according to the following formula:

$$\text{sign}(h_0) \cdot \hat{u}_k(t) = \text{sign}\left(\frac{\text{alpha} - \text{beta} \cdot x}{1 - x^2}\right) \quad (14)$$

being sign(.) a function equal to +1 or −1 when its argument is positive or negative, respectively.

Equation (14) allows to obtain the analog approximation signal because in the considered example Eq. (1) holds, thus only the sign of the symbol $u_k$ is to be estimated. The block UNIT 600 samples this signal at a frequency multiple than the symbol frequency 1/T by an integer number N of times, and decides the value of the received symbol depending on the detected samples. The block CONVOLUTIONAL ENCODER updates the analog signal $\hat{\phi}_k(t)$ that approximates the phase associated to the symbol $u_k$, in function of the approximation signal $\hat{u}_k(t)$ and of the estimation of the received symbol $\hat{u}_k$.

At the end of the symbol period, the block DECISOR (FIG. 10) generates a final estimation of the current symbol $u_k$, that will be provided to the block ENCODER of FIG. 8, which on its turn will generate the phase $\hat{\phi}_{k-1}$.

Figure 12:
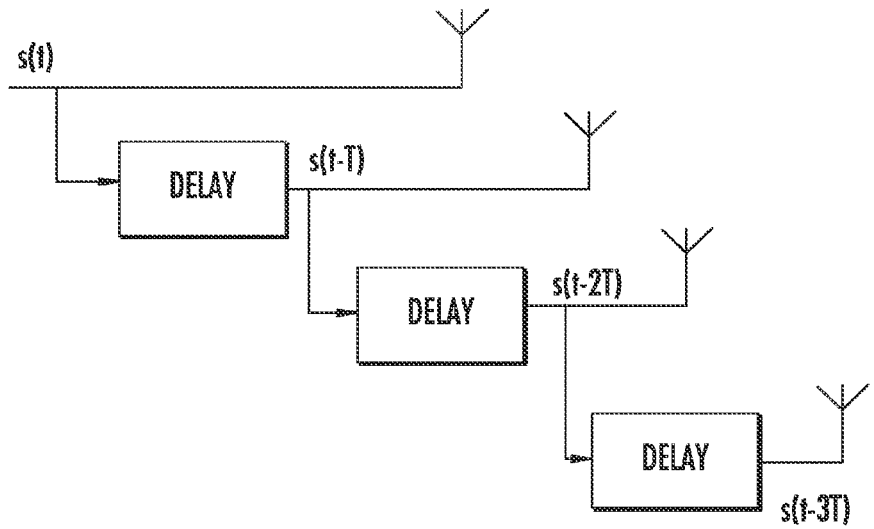
FIG. 12 is a schematic diagram illustrating four antennas connected in the transmitter of the invention of FIG. 4.
Figure 14:
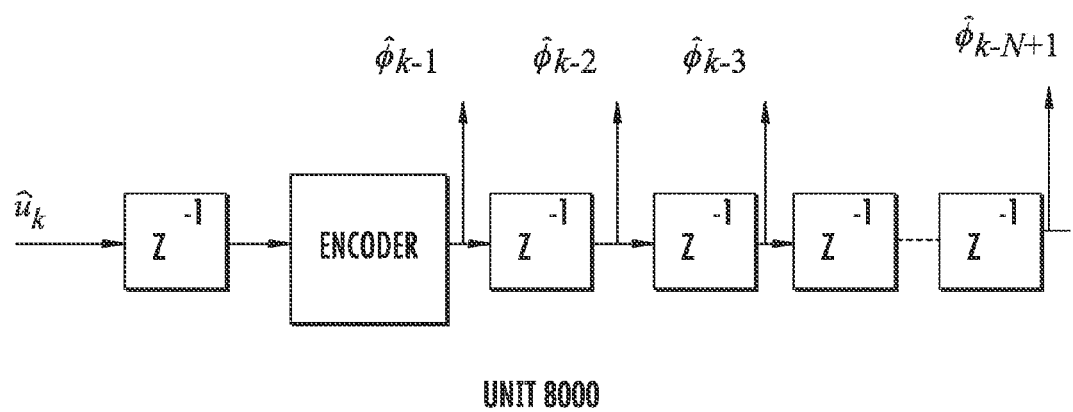
FIGS. 14 to 17 are schematic diagrams illustrating the circuit blocks of the receiver of the invention of FIG. 13.

The generalization to the case in which the transmitter has more than two transmitting antennas is immediate. As shown in FIG. 12 for the case N=4, each transmitting antenna sends a replica of the signal s(t), that transmits the current symbol, delayed by delay lines DELAY, of a corresponding number of symbol periods T, thus the received signal r(t) is given by:

$$r(t) = h_0 \cdot u_k \cdot \cos(2\pi f_0 t + \phi_k) + \sum_{j=1}^{N-1} h_j \cdot u_{k-j} \cdot \cos(2\pi f_0 t + \phi_{k-j}) + n(t) \quad (15)$$

Figure 13:
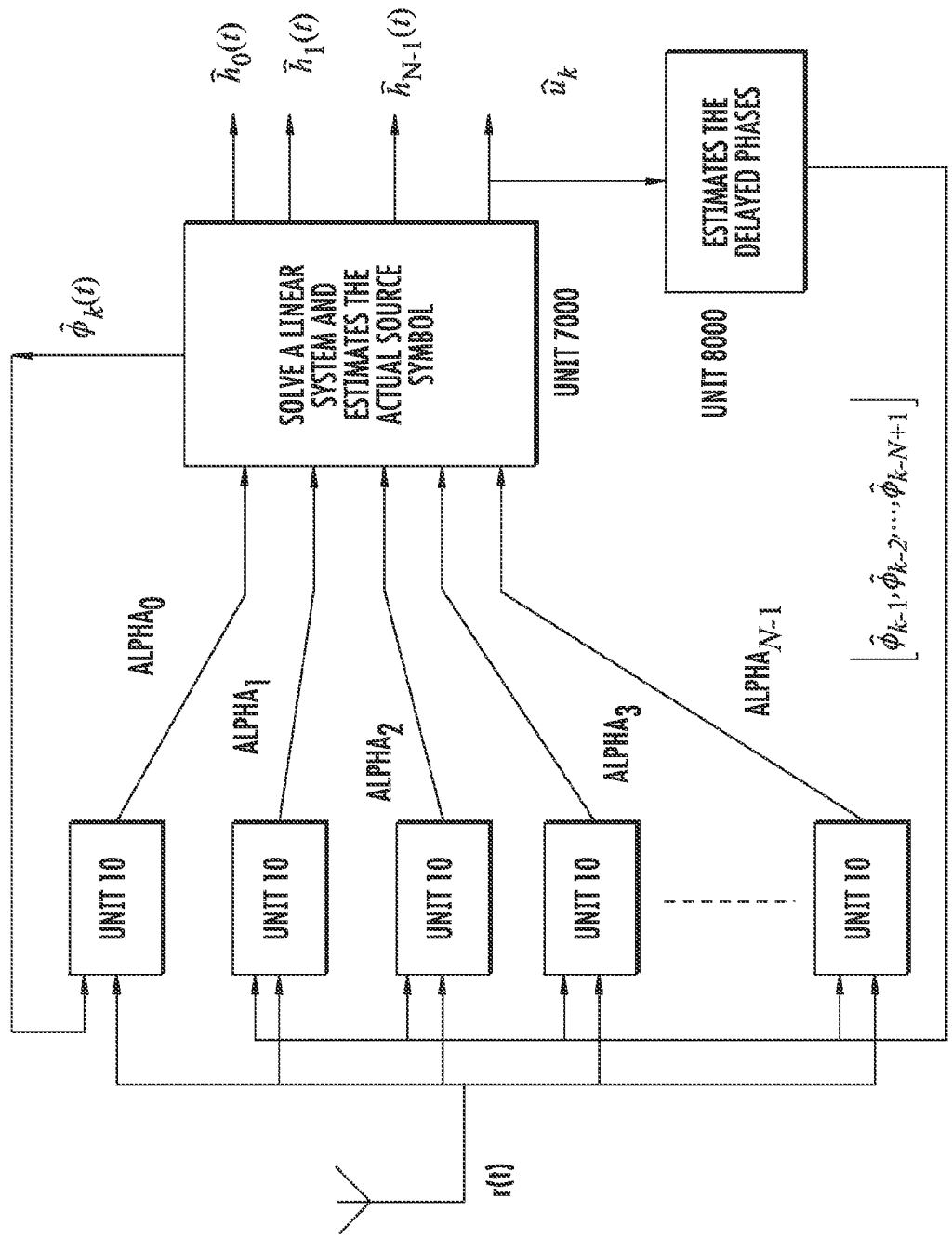
FIG. 13 is a schematic diagram illustrating a receiver of the invention for receiving a same sequence of symbols transmitted with N antennas.
Figure 15:
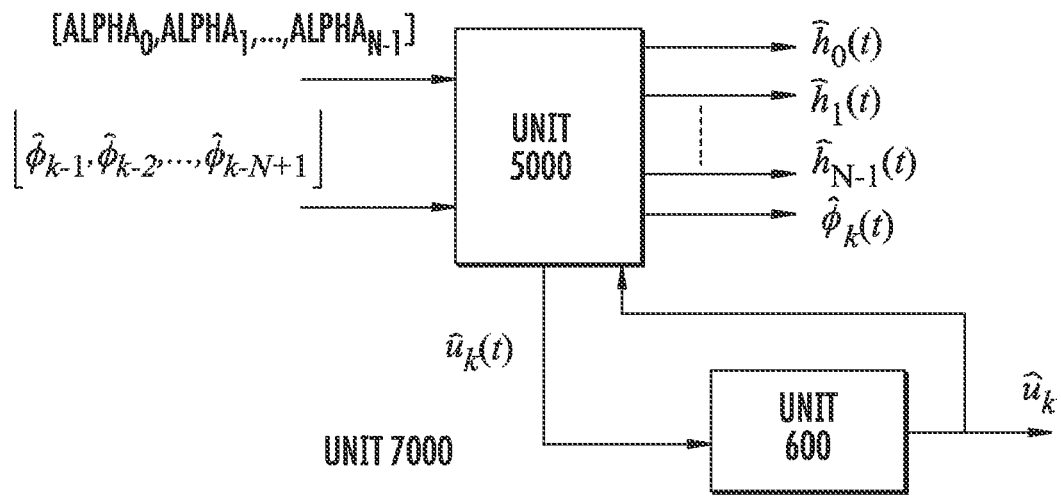

The receiver and "channel estimator" of the invention in case of N transmitting antennas is shown in FIG. 13. The various functional blocks that compose it are depicted in detail in Figures from 14 to 17. The functioning of the receiver of the invention of FIG. 13 is substantially analogous to that of FIG. 8. Starting from a signal $\hat{\phi}_k(t)$ that approximates the phase associated to the current symbol $u_k$, and by estimations of the phases $\hat{\phi}_{k-1}, \ldots, \hat{\phi}_{k-N+1}$ associated to the previous symbols, the DC components $\text{alpha}_0, \ldots, \text{alpha}_{N-1}$ are extracted from the received signal r(t) by coherent demodulations locked to the phases $\phi_k, \ldots, \phi_{k-N+1}$.

In the hypothesis in which the phases are locked $$\hat{\phi}_{k-j} = \phi_{k-j} \, \forall k, j \quad (16)$$

the DC components will be given by the following equations:

$$\text{alpha}_0 = h_0 \cdot u_k + \sum_{j=1}^{N-1} h_j \cdot u_{k-j} \cdot \cos(\hat{\phi}_k - \hat{\phi}_{k-j}) + n_{o,k} \quad (17)$$

$$\text{alpha}_1 = h_0 \cdot u_k \cdot \cos(\hat{\phi}_{k-1} - \hat{\phi}_k) + \sum_{j=1}^{N-1} h_j \cdot u_{k-j} \cdot \cos\left(\hat{\phi}_{k-1} - \hat{\phi}_{k-j}\right) + n_{1,k}$$

$$\text{alpha}_n = h_0 \cdot u_k \cdot \cos(\hat{\phi}_{k-n} - \hat{\phi}_k) + \sum_{j=1}^{N-1} h_j \cdot u_{k-j} \cdot \cos\left(\hat{\phi}_{k-n} - \hat{\phi}_{k-j}\right) + n_{n,k}$$

Figure 7:
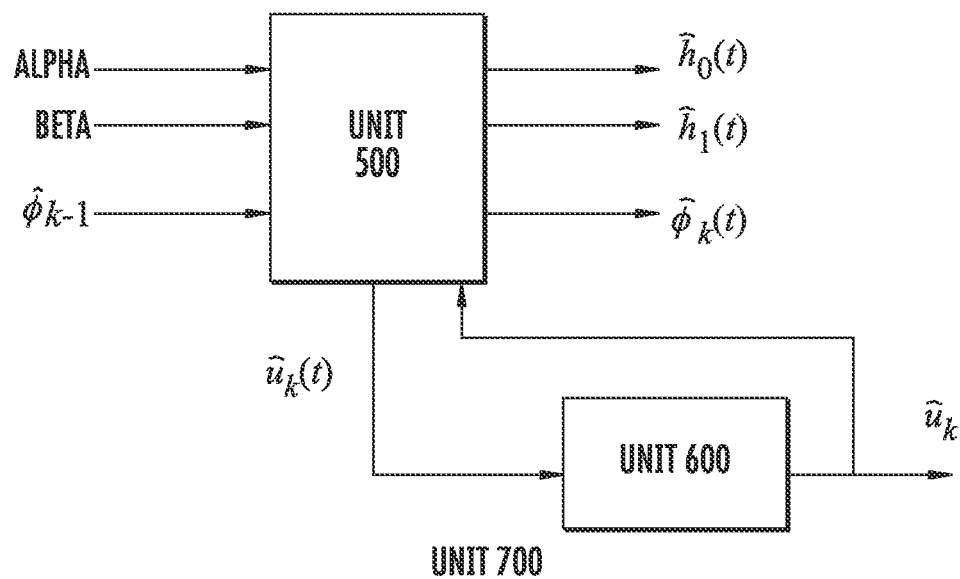
FIGS. 7 to 10 are schematic diagrams illustrating the various circuit blocks that compose the circuit UNIT 700 of FIG. 5.
Figure 17:
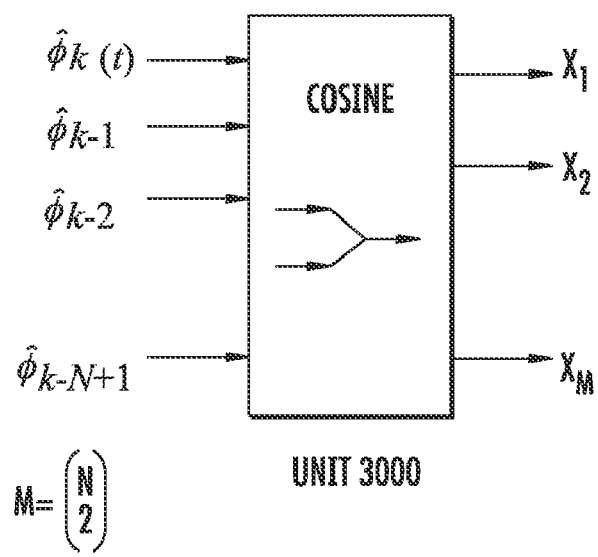
Figure 16:
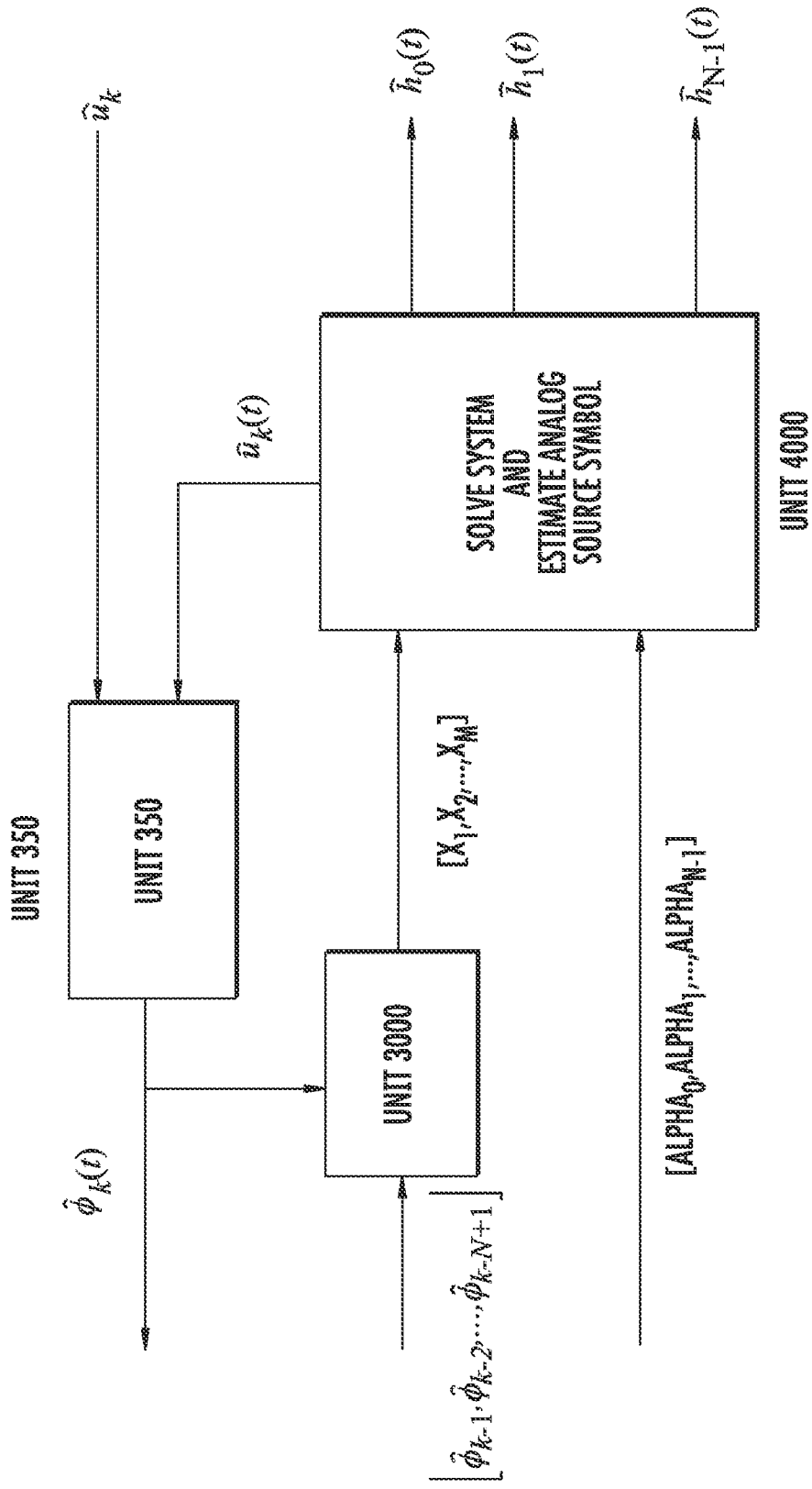

The various cosine functions of the differences of pairs of phases are calculated by the block UNIT 3000 of FIG. 17, which is a generalization of the block UNIT 300 of FIG. 7.

Being $$x_{i,j} = \cos(\hat{\phi}_{k-i} - \hat{\phi}_{k-j}) \quad (18)$$

and neglecting the terms $n_{i,j}$ due to the noise n(t) that corrupts the received signal r(t), the previous equations may be written in the following vector form:

$$[A] \cdot \begin{bmatrix} h_0 \cdot u_k \\ h_1 \cdot \hat{u}_{k-1} \\ \ldots \\ h_{N-1} \cdot \hat{u}_{k-N+1} \end{bmatrix} = \begin{bmatrix} \text{alpha}_0 \\ \text{alpha}_1 \\ \ldots \\ \text{alpha}_{N-1} \end{bmatrix} \quad (19)$$

wherein the symbols $u_{k-1}, \ldots, u_{N-1}$ have been substituted by the respective estimations $\hat{u}_{k-1}, \ldots, \hat{u}_{k-N+1}$ and the matrix [A] is the following matrix of coefficients:

$$A = \begin{bmatrix} 1 & x_{0,1} & \ldots & x_{0,N-1} \\ x_{0,1} & 1 & \ldots & x_{1,N-1} \\ \ldots & \ldots & \ldots & \ldots \\ x_{0,N-1} & x_{1,N-1} & \ldots & 1 \end{bmatrix} \quad (20)$$

Equation (19) may be solved if the matrix of coefficients [A] is non singular. This may be obtained by ensuring that there are not N phases (and thus N symbols) such to generate a singular matrix of coefficients, or by scaling some cosine functions (for example the terms on the main diagonal) of a factor near to one, as carried out by the block UNIT 300 of FIG. 7.

Clearly, the fading coefficients $h_1, \ldots, h_{N-1}$ of the various channels, except the fading coefficient of the channel that transmits the current symbol, will be given by the following equations:

$$h_1 \cdot \hat{u}_{k-1} = \frac{\det\begin{bmatrix} 1 & \text{alpha}_0 & \ldots & x_{0,N-1} \\ x_{0,1} & \text{alpha}_1 & \ldots & x_{1,N-1} \\ \ldots & \ldots & \ldots & \ldots \\ x_{0,N-1} & \text{alpha}_{N-1} & \ldots & 1 \end{bmatrix}}{\det[A]} \quad (21)$$

$$h_{N-1} \cdot \hat{u}_{k-N+1} = \frac{\det\begin{bmatrix} 1 & x_{0,1} & \ldots & \text{alpha}_0 \\ x_{0,1} & 1 & \ldots & \text{alpha}_1 \\ \ldots & \ldots & \ldots & \ldots \\ x_{0,N-1} & x_{1,N-1} & \ldots & \text{alpha}_{N-1} \end{bmatrix}}{\det[A]}$$

and they can be always determined because the estimated values $\hat{u}_{k-1}, \ldots, \hat{u}_{k-N+1}$ relate to already estimated symbols and thus they are known.

The fading coefficient $h_0$ of the channel that transmits the current symbol is calculated as shown referring to the receiver of FIG. 8. First a "training sequence" is transmitted and the sign of the fading coefficient $h_0$ is estimated according to the following equation:

$$\text{sign}(h_0) = \text{sign}\left(\frac{\det\begin{bmatrix} \text{alpha}_0 & x_{0,1} & \ldots & x_{0,N-1} \\ \text{alpha}_1 & 1 & \ldots & x_{1,N-1} \\ \ldots & \ldots & \ldots & \ldots \\ \text{alpha}_{N-1} & x_{1,N-1} & \ldots & 1 \end{bmatrix}}{\det[A]}\right) \quad (22)$$

When a symbol that does not belong to a "training sequence" is transmitted, the receiver estimates the channel fading on which it is transmitted by supposing that the sign, calculated with the previous equation, is not varied. An approximation signal $\hat{u}_k(t)$ of the current symbol is generated according to the following equation:

$$\text{sign}(h_0) \cdot \hat{u}_k(t) = \text{sign}\left(\frac{\det\begin{bmatrix} alpha_0 & x_{0,1} & \ldots & x_{0,N-1} \\ alpha_1 & 1 & \ldots & x_{1,N-1} \\ \ldots & \ldots & \ldots & \ldots \\ alpha_{N-1} & x_{1,N-1} & \ldots & 1 \end{bmatrix}}{\det[A]}\right) \quad (23)$$

and the module of the fading coefficient is estimated with the following formula:

$$|h_0| = \left|\frac{\det\begin{bmatrix} alpha_0 & x_{0,1} & \ldots & x_{0,N-1} \\ alpha_1 & 1 & \ldots & x_{1,N-1} \\ \ldots & \ldots & \ldots & \ldots \\ alpha_{N-1} & x_{1,N-1} & \ldots & 1 \end{bmatrix}}{\det[A]}\right| \quad (24)$$

The remaining part of the receiver is substantially identical to that of the case in which there are only two transmitting antennas. The block UNIT 600 samples the approximation signal a plurality of times during a same symbol period and sends the samples to the block CONVOLUTIONAL ENCODER that generates an analog signal that approximates the current phase $\hat{\phi}_k(t)$, used for extracting the DC components $alpha_0, \ldots, alpha_{N-1}$ and for calculating the various coefficients of the matrix [A].

Figure 18:
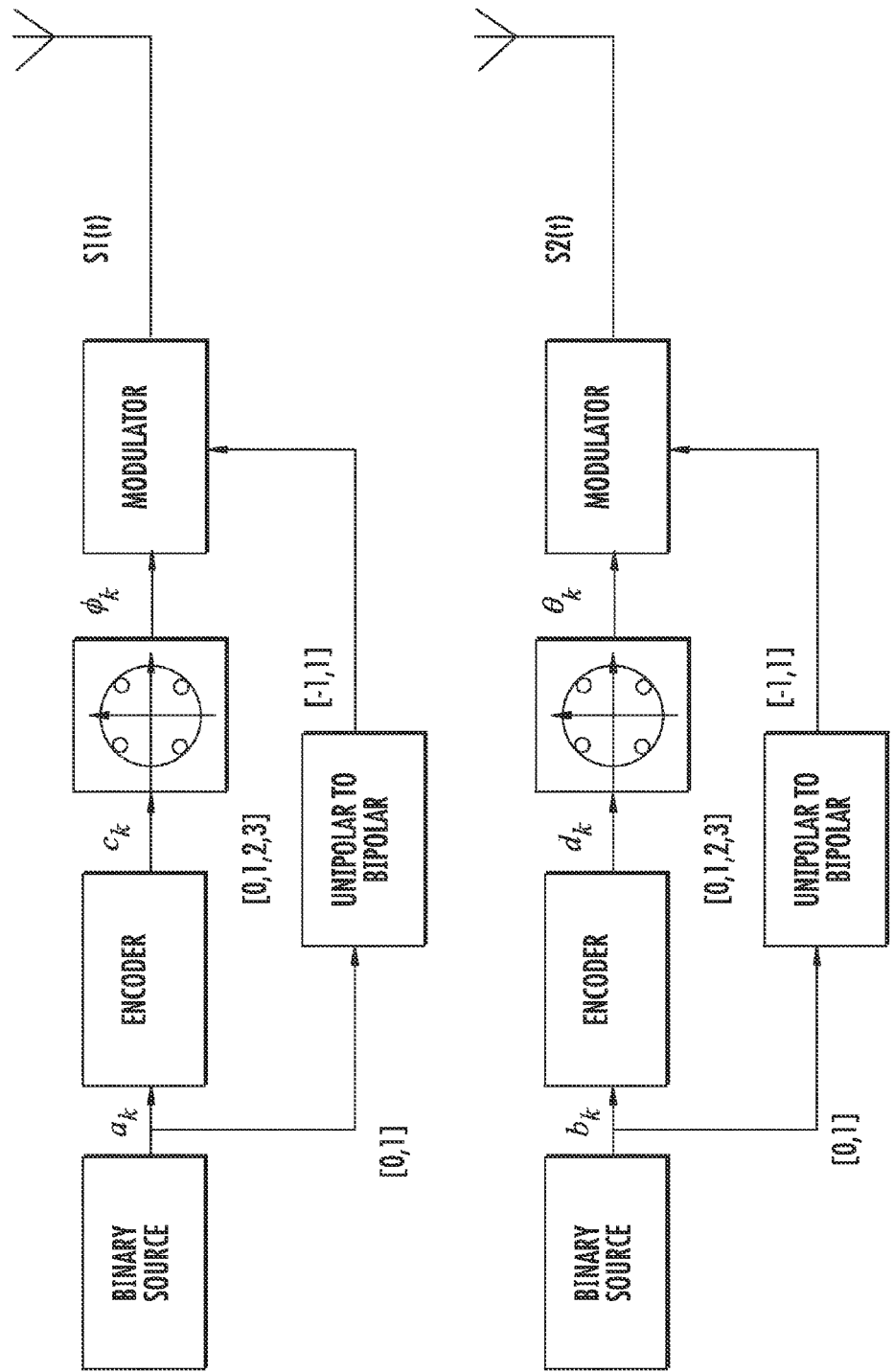
FIG. 18 is a schematic diagram illustrating two identical transmitters of the invention that transmit one independently from the other.

The receiver and "channel estimator" of the invention may be adapted for demodulating AM-PSK signals coming from two or more users that transmit one independently from the other. For sake of easy let us refer to the case in which there are only two independent users that are transmitting, as illustrated in FIG. 18, but the same considerations may be generalized, with the necessary changes, to the case of any number of independent users.

Figure 19:
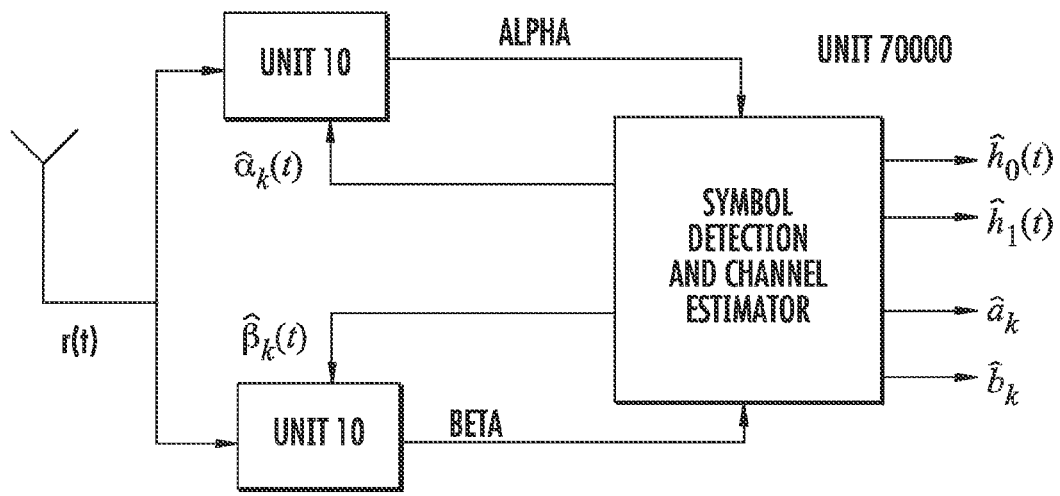
FIG. 19 is a schematic diagram illustrating another receiver and "channel estimator" of the invention for receiving symbols transmitted by the transmitters of FIG. 18.

The single antenna demodulator of this invention for receiving two sequences of symbols $a_k$ and $b_k$ transmitted by two independent users and for estimating the fading coefficients of the respective channels is depicted in FIG. 19. The generalization to the case of more than two independent users is immediate.

Compared with the receiver of FIG. 8, the receiver of the invention has a block UNIT 700 that generates as many analog signals $\hat{\alpha}_k(t)$ and $\hat{\beta}_k(t)$ that approximate the phases $\alpha_k$ and $\beta_k$ of the AM-PSK signals relative to the symbols $a_k$ and $b_k$. The received signal is given by the following equation $$r(t) = h_0 \cdot a_k \cdot \cos(2\pi f_0 t + \alpha_k) + h_1 \cdot b_k \cdot \cos(2\pi f_0 t + \beta_k) + n(t) \quad (25)$$

The receiver and "channel estimator" of FIG. 19 has two demodulators UNIT 10 that generate respective DC components alpha and beta given by the following equations:

$$\text{alpha} = h_1 \cdot a_k \cdot \cos(\alpha_k - \hat{\alpha}_k) + h_2 \cdot b_k \cdot \cos(\beta_k - \hat{\alpha}_k)$$

$$\text{beta} = h_1 \cdot a_k \cdot \cos(\alpha_k - \hat{\beta}_k) + h_2 \cdot b_k \cdot \cos(\beta_k - \hat{\beta}_k) \quad (26)$$

If the phases associated to the symbols $a_k$ and $b_k$ are locked, the following equations hold $$\text{alpha} = h_1 \cdot a_k + h_2 \cdot b_k \cdot x$$

$$\text{beta} = h_1 \cdot a_k \cdot x + h_2 \cdot b_k \quad (27)$$

being $$x = \cos(\hat{\beta}_k - \hat{\alpha}_k) \quad (28)$$

According to the preferred embodiment of the method of the invention, first a "training sequence" is sent for estimating the signs of the fading coefficients $h_0$ and $h_1$ of the channels, then symbols unknown a priori are sent to the receiver and are estimated together with the fading coefficient of the channels supposing that their signs be the same of those estimated during the previous "training sequence".

Figure 20:
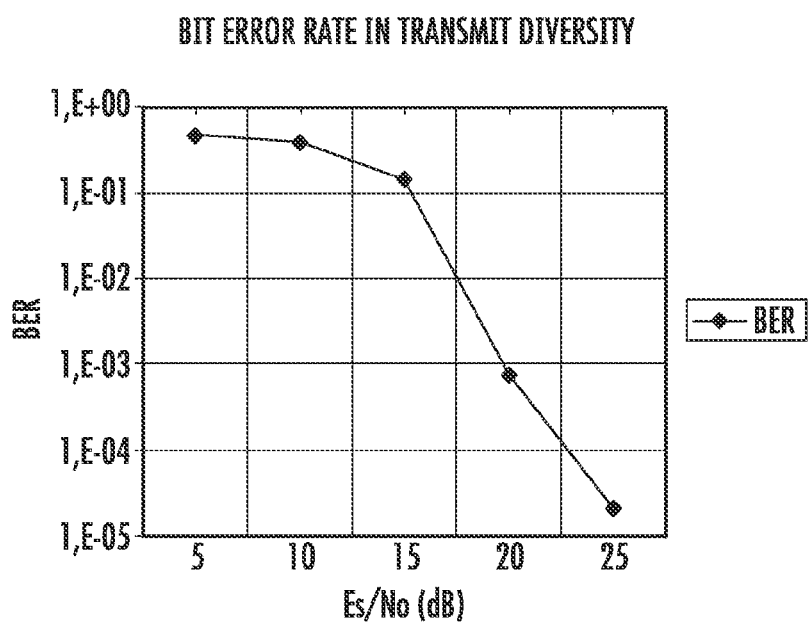
FIGS. 20 and 21 are diagrams that illustrate the performances of the receiver of FIG. 4 in function of the signal-to-noise ratio at the receiver.

The functioning of the receiver and "channel estimator" of FIG. 8 has been simulated for transmissions through channels with fading coefficients that vary with time in an extremely rapid manner, for different values of the signal-to-noise ratio at the transmitter. FIG. 20 is a graph of the bit-error rate (BER) in function of the signal-to-noise ratio. As it is possible to notice, when a certain threshold is surpassed, the BER reduces of two orders of magnitude if the signal-to-noise ratio increases of 10 dB, while in the known receivers the BER decreases only is of one order of magnitude every 10 dB.

To evaluate the reliability of the estimation of the fading coefficient of the channels used by the receiver of FIG. 8, the mean square error MSE of the estimations $\hat{h}_i$ of the fading coefficient h, divided by the signal-to-noise ratio $\sigma$ at the receiver, has been considered:

$$MSE = \frac{1}{\sigma^2} \cdot \sum_i E\left\{\left(h - \hat{h}_i\right)^2\right\} \quad (29)$$

Figure 21:
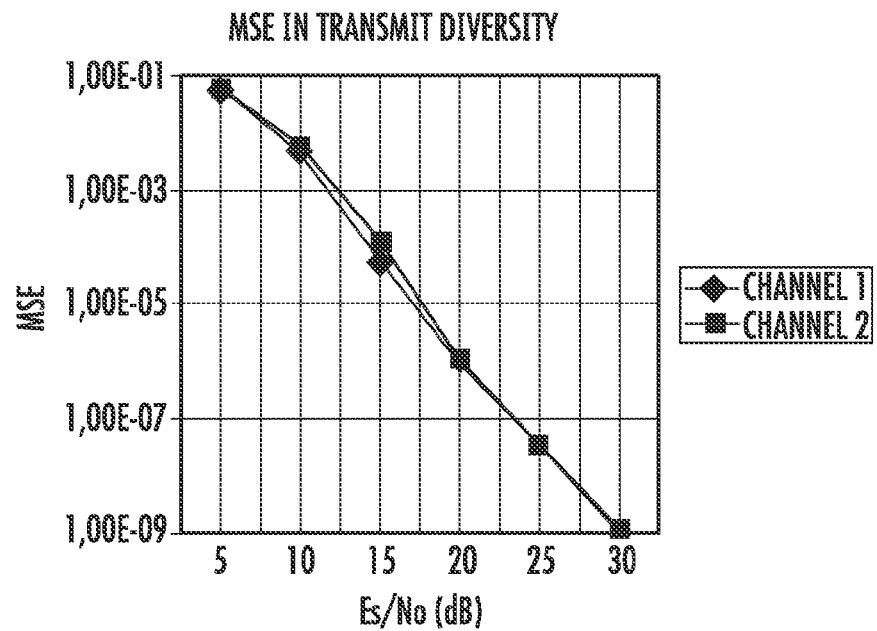

The results are represented in the graph of FIG. 21 that shows that the MSE decreases of two orders of magnitude every 5 dB of increase of the signal-to-noise ratio.

Figure 22:
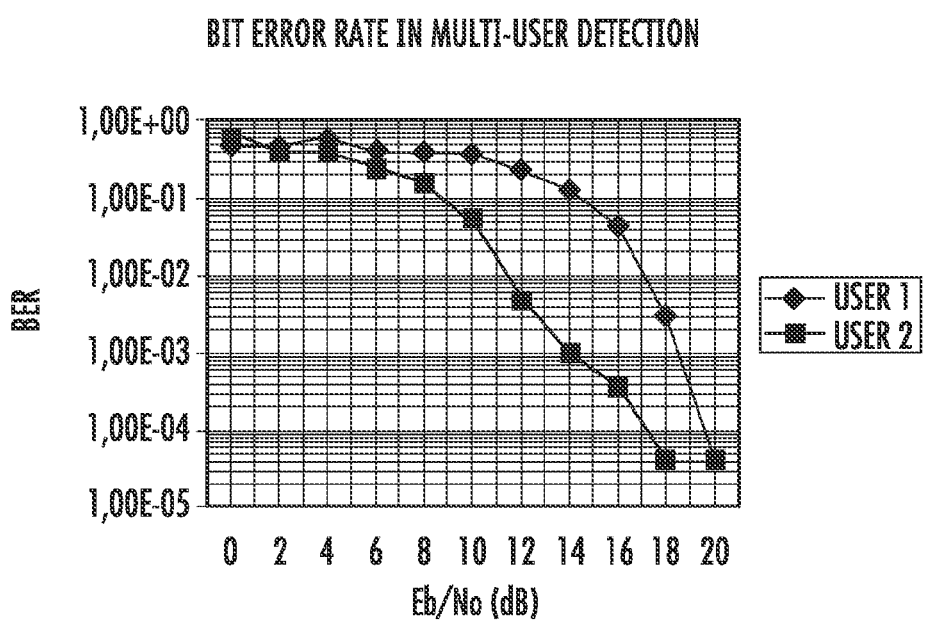
FIGS. 22 and 23 are diagrams that illustrate the performances of the receiver of FIG. 19 in function of the signal-to-noise ratio at the receiver.
Figure 23:
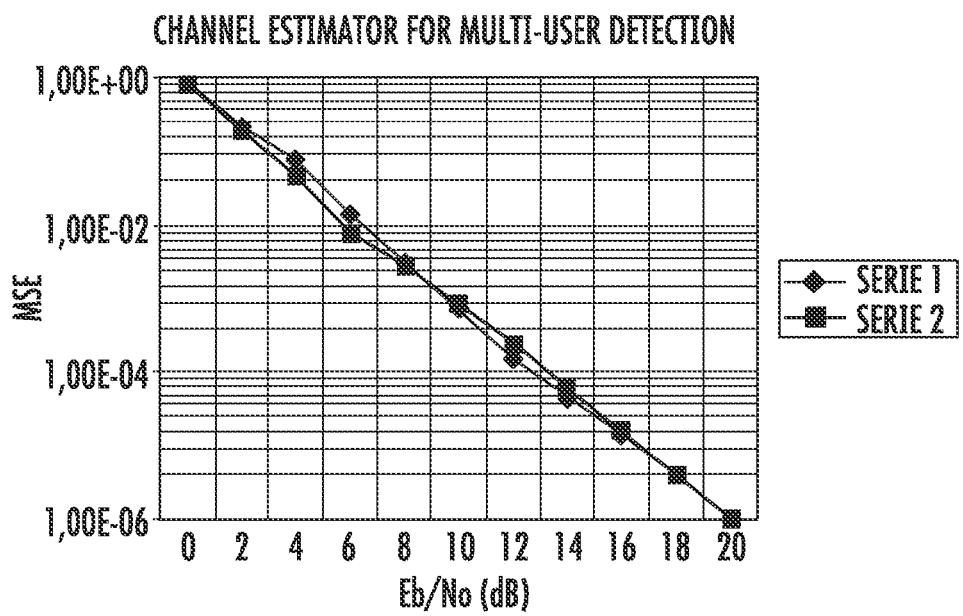
Figure 24:
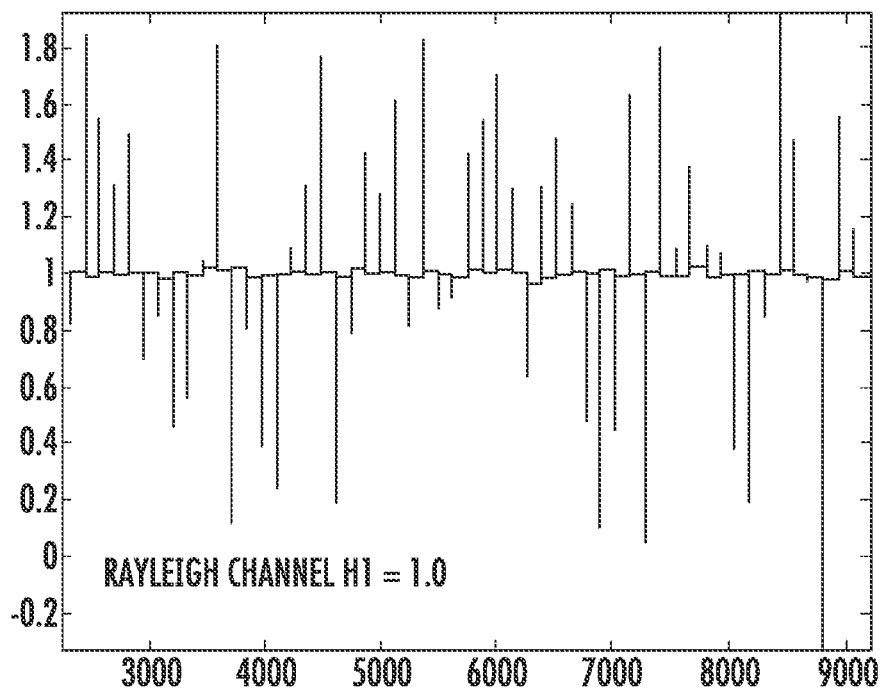
FIG. 24 is a diagram showing the results of the estimation of the fading coefficient in case of a single-path transmission.

FIGS. 22 and 23 show similar diagrams for the receiver of FIG. 19 in the case of a transmission by a plurality of independent users. FIG. 24 is a graph of the estimation of the fading coefficient in case of a single-path.

In the previous discussion it has been considered the case in which the signal r(t) is not disturbed by inter-symbolic interference and is received only through pre-established channels. These ideal conditions are rarely verified in real transmissions, wherein inter-symbolic interference and other copies attenuated and outphased of the transmitted signal are present.

More in detail, because of the multi-path fading a received signal r(t) will contain more copies of the transmitted AM-PSK signal, each attenuated with a respective unknown fading coefficient $h_{0,1}$ and stochastic delay $\tau_{MPF}$:

$$h_{0,1}(t) \cdot u_{k-j} \cdot \cos(2\pi f_o(t - \tau_{MPF}) + \phi_{k-j}) \quad (30)$$

The delay $\tau_{MPF}$ satisfies the following inequalities:

$$[jT \leq \tau_{MPF} \leq (j+1)T] \quad (31)$$

wherein T is the symbol period. To consider these additional terms, the receiver and "channel estimator" of the invention will comprise conveniently as many demodulators UNIT 10 locked to the phases $\phi_{k-j}$. The delay $\tau_{MPF}$ may be estimated with statistical methods and compensated by the voltage controlled oscillator VCO or by the block UNIT 3000 that generates the cosine functions, and for these reasons it will be considered known.

Inter-symbolic interferences (ISI) are due to the use of filters at the transmitter and at the receiver side that do not satisfy the Nyquist condition. Inter-symbolic interferences introduce in the received signal r(t) terms of the form $$h_0(t) \cdot u_{k-i} \cdot \cos(2\pi f_o \cdot (t-\tau_{ISI}) + \phi_{k-i}) \quad (32)$$

wherein the delay $\tau_{ISI}$ is known. The DC components will be given by:

$$h_0(t) \cdot u_k + h_{0,1}(t) \cdot u_{k-1} \cdot \cos(\Delta\Phi) + + h_0(t) \cdot u_{k-i} \cdot \cos(-2\pi f_0 \tau_{ISI} + \phi_{k-i} - \phi_k) = \text{alpha} \quad (33)$$

$$h_0(t) \cdot u_k \cdot \cos(\Delta\Phi) + h_{0,1}(t) \cdot u_{k-j} + + h_0(t) \cdot u_{k-i} \cos(2\pi f_0 (\tau_{MPF} - \tau_{ISI}) + \phi_{k-i} - \phi_{k-j}) = \text{beta}$$

being $$\Delta\Phi = 2\pi f_0 \tau_{MPF} + \phi_{k-j} - \phi_k \quad (34)$$

As it is possible to notice, the inter-symbolic interference does not introduce new unknown terms in the formulas that give the DC components alpha and beta, while the signals due to multi-path fading increase the number of unknown terms to be determined, represented by the fading coefficients of the respective channels through which they have been transmitted.

If it is possible to add a demodulation line with a coherent demodulator UNIT 10 for each component of the signal r(t) in the receiver of FIG. 19, then the estimation of the fading coefficient $h_0$ of the main channel is highly accurate despite the above mentioned disturbances. When this is not possible for example because of specifications of silicon area occupation and power consumption, there is a progressive worsening of the performances, that may be compensated by increasing the signal-to-noise ratio at the receiver.

The performances of the receiver of FIG. 19 have been measured for a transmission on a channel, affected by multi-path interference, described in the following table:

TABLE 1

| Path No. | Fading (dB) |
| --- | --- |
| 0 | 0 |
| 1 | −6 |
| 2 | −6 |
| 3 | −12 |
| 4 | −12 |
| 5 | −18 |

Figure 25:
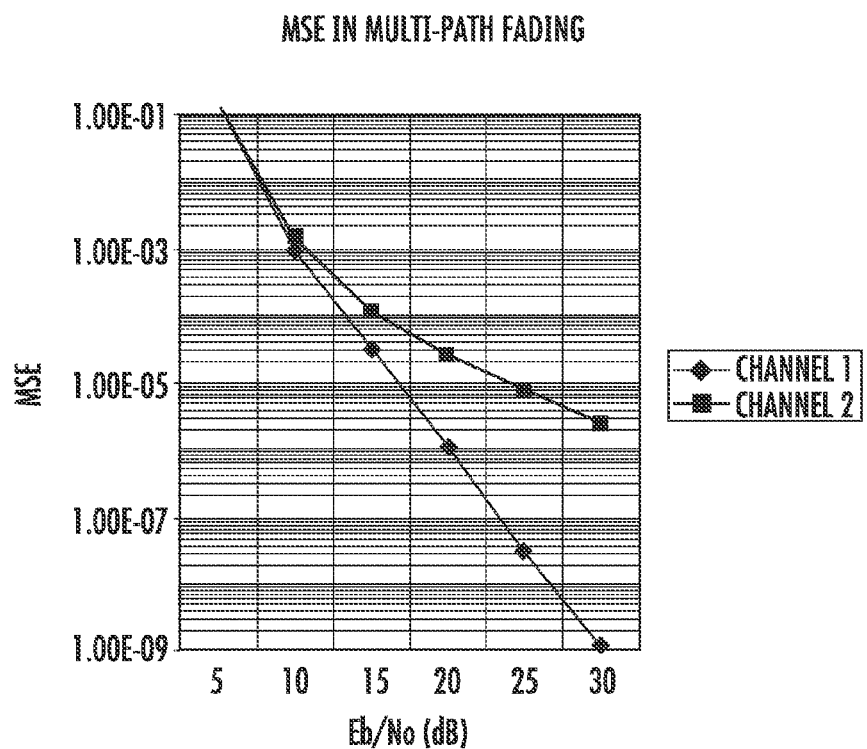
FIG. 25 is a sample diagram of the medium square error MSE of the receiver of FIG. 4 for different values of the signal-to-noise ratio for a transmission on the channel described in Table 1.

Using a channel with such critical characteristics, the results shown in the diagram of FIG. 25, which are surely satisfactory, have been obtained.

Among the advantages of the receivers of the invention is it worth mentioning the outstanding simple architecture. Indeed, the receivers essentially comprise analog devices that may be realized in the form of a voltage controlled oscillator VCO, low-pass filters and multipliers, besides a digital unit for estimating the fading coefficients, while the known receivers use Kalman filters and adaptive equalizers, the architectures of which are quite complex. Moreover, the receivers of the invention do not require a stochastic model of the transmission channel, that relevantly influences the correct functioning of the known receivers and "channel estimators".

As an option, it is possible to use the receiver and "channel estimator" of the invention for obtaining a first estimation of the transmitted symbols and of the fading coefficients of the channel. These estimations may be input to known receivers together with the received signal r(t) for determining, with a reduced error probability, the transmitted symbols and the fading of the transmission channels.

The invention may be easily extended to systems with a plurality of transmitting antennas and a plurality of receiving antennas, each receiving antenna having a respective receiver and "channel estimator" of the invention. The estimations generated by the receivers, in this case, are processed, according to well known methods such as for example the methods disclosed in the book "Digital Communications" (Proakis, third ed.) or "Space-time coding" (B. Vucetic and J. Yuan, Wiley), for generating even more accurate estimations of the fading coefficients of the transmission channels and of the transmitted symbols.

Figure 26:
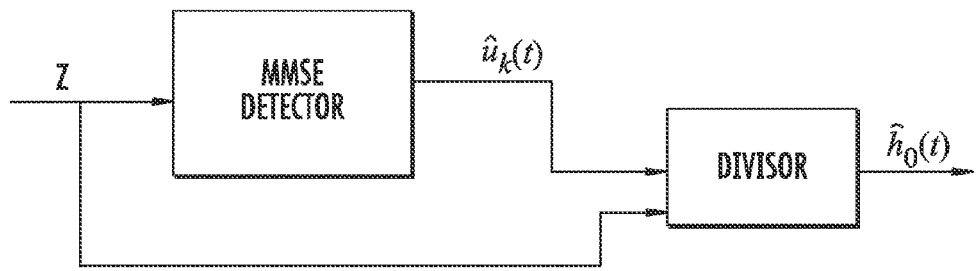
FIG. 26 is a schematic diagram illustrating circuit blocks to be added to the receivers of the invention for estimating the fading coefficient of a channel and the transmitted symbols when each symbol is identified by more than one bit.

The functioning of the proposed receivers has been shown referring to the symbols +1 and −1, but it is easy to extend the above description to the transmission of symbols identified by two or more bits. For example, if the symbols that may be transmitted belong to the following set:

$$u_k \in \{-2, -1, +1, +2\} \quad (35)$$

a "training sequence" is transmitted for estimating the sign of the channel fading, then the fading coefficient of the channel on which the current symbol has been transmitted is calculated with the following equation:

$$h_0 \cdot \hat{u}_k(t) = \frac{\det\begin{bmatrix} alpha_0 & x_{0,1} & \ldots & x_{0,N-1} \\ alpha_1 & 1 & \ldots & x_{1,N-1} \\ \ldots & \ldots & \ldots & \ldots \\ alpha_{N-1} & x_{1,N-1} & \ldots & 1 \end{bmatrix}}{\det[A]} = z \quad (36)$$

in the case in which there are N transmitting antennas of a single transmitter. As shown in FIG. 26, the calculated value z is provided to a minimum mean square error detector MMSE DETECTOR, that generates the approximation signal of the current symbol $\hat{u}_k(t)$. The block MMSE DETECTOR will be preferably designed for providing an approximation signal corresponding to that symbol $\tilde{u}$, of the set of symbols that may be transmitted, that maximizes the probability p of obtaining the calculated value z, that is:

$$\hat{u}_k \Rightarrow \max_{\tilde{u}} [p(z | \tilde{u})] \quad (37)$$

$$p(z | \tilde{u}) = p_{h_0}[h_0 \cdot \tilde{u}]$$

being $p_{h_0}$ the density of probability of the fading coefficient. Equation (37) has been formulated considering that, from Eq. (36), $$z = h_0 \hat{u}_k$$

thus $$p(z | \tilde{u}) = p(h_0 \hat{u}_k | \tilde{u}) = p_{h_0}[h_0 \tilde{u}]$$

The block DIVISOR generates an estimation of the fading coefficient of the channel by dividing the value z by $\hat{u}_k(t)$.

As an alternative, it is possible to design the block MMSE DETECTOR for generating an estimation of the coefficient $h_0$ and making the block DIVISOR generate an estimation of the received symbol.

That which is claimed is:

1. A method for receiving symbols of a sequence transmitted on at least two transmission channels through AM-PSK modulated signals, a sequence of known symbols being established and transmitted for the sequence of symbols for estimating the fading coefficients of the transmission channels, the method comprising:
- in each symbol period, receiving a linear combination signal as a combination of the AM-PSK modulated signals;
- extracting a first DC component from the received linear combination signal via a coherent demodulation locked to a first phase;
- extracting at least a second DC component from the received linear combination signal via a coherent demodulation locked to a second phase;
- generating first estimations of each transmitted symbol based upon the estimated fading coefficients, the DC components and mutual outphasing between the AM-PSK modulated signals;
- estimating unknown phases corresponding to the transmitted symbols based upon the respective first estimations;
- estimating further fading coefficients of the channels based upon the first estimations, the DC components, the mutual outphasing between the AM-PSK modulated signals and estimations of previously transmitted symbols;
- at the end of a symbol period, determining the values of transmitted symbols based upon the respective estimated phases in the symbol period.

2. The method of claim 1, further comprising:
- estimating a sign of at least one fading coefficient of a channel during the transmission of the known sequence of symbols; and
- generating the first estimations of the values of transmitted symbols and estimating the module of each fading coefficient based upon a sign of the fading coefficient being identical to the estimated sign during the transmission of the known sequence.

3. The method of claim 2, wherein at least one transmission channel introduces multi-path interference; and
- wherein the method is carried out for each delayed and faded replica of the transmitted signal.

4. The method of claim 1, wherein the fading coefficients are estimated by:
- calculating a product between a received symbol and the fading coefficient of a channel on which it has been transmitted;
- generating the estimation of the fading coefficient of a channel based upon the product via a minimum mean square error (MMSE) calculation; and
- generating the first estimation of the value of the transmitted symbol by dividing the product by the estimation of the fading coefficient.

5. The method of claim 1, wherein the fading coefficients are estimated by:
- calculating a product between a received symbol and the fading coefficient of a channel on which it has been transmitted;
- generating the first estimation of the value of the transmitted symbol based upon the product via a minimum mean square error (MMSE) calculation; and
- generating the estimation of the fading coefficient of a channel by dividing the product by the first estimation of the value of the transmitted symbol.

6. The method of claim 1, wherein the estimation of the phase associated to a transmitted symbol is carried out by:
- generating a time-continuous approximation value of the value of the transmitted symbol based upon the first DC component;
- sampling the approximation value a plurality of times in the symbol period;
- generating the estimation based upon samples obtained; and
- generating the estimation of the phase based upon the approximation value and of the first estimation.

7. The method of claim 1, wherein each of the DC components is obtained by:
- generating a sinusoidal signal having a same carrier as the received signal and phase equal to the estimated phase;
- generating an intermediate signal by multiplying the sinusoidal signal by the received signal; and
- filtering out a component of the intermediate signal modulated at a frequency twice that of the sinusoidal signal, to obtaining the DC component.

8. The method of claim 1, further comprising:
- calculating, for each pair of phases, a cosine of the difference between the respective estimations of the phases;
- generating auxiliary values scaling the cosine functions by a coefficient less than one; and
- generating an estimation of a fading coefficient of each channel used in the transmission of the symbols and the first estimation of the value of the current symbol, based upon DC components, the auxiliary values and estimations of the fading coefficients previously carried out.

9. A method for determining symbol values from a received signal based upon a plurality of channels carrying AM-PSK modulated signals, the method comprising:
- extracting a first DC component from the received signal via a coherent demodulation locked to a first phase;
- extracting a second DC component from the received signal via a coherent demodulation locked to a second phase;
- generating first estimations of each transmitted symbol based upon estimated fading coefficients, and the first and second DC components;
- estimating unknown phases corresponding to the transmitted symbols based upon the respective first estimations; and
- at the end of a symbol period, determining the symbol values based upon the respective estimated phases.

10. The method of claim 9, further comprising:
- estimating a sign of at least one fading coefficient of a channel during transmission of a known sequence of symbols; and
- generating the first estimations of the values of transmitted symbols and estimating the module of each fading coefficient based upon a sign of the fading coefficient being identical to the estimated sign during the transmission of the known sequence.

11. The method of claim 9, wherein at least one transmission channel introduces multi-path interference; and wherein the method is carried out for each delayed and faded replica of the transmitted signal.

* * * * *

UNITED STATES PATENT AND TRADEMARK OFFICE
CERTIFICATE OF CORRECTION

| | | |
|---|---|---|
| PATENT NO. | : 7,929,643 B2 | |
| APPLICATION NO. | : 12/622054 | |
| DATED | : April 19, 2011 | |
| INVENTOR(S) | : Visalli et al. | |

It is certified that error appears in the above-identified patent and that said Letters Patent is hereby corrected as shown below:

Column 2, Line 4            Delete: "of"
                            Insert: --by--

Column 2, Line 7            Delete: "of"
                            Insert: --by--

Column 2, Line 12           Delete: "of"
                            Insert: --as--

Column 3, Line 30           Delete: "repeating"
                            Insert: --to repeat--

Column 7, Line 11           Delete: "explained"
                            Insert: --be explained--

Column 8, Line 23           Delete: "consecutively"
                            Insert: --consecutive--

Column 8, Line 48           Delete "on"
                            Insert: --of--

Column 12, Line 10          Delete: "of"
                            Insert: --as--

Column 12, Line 19          Delete: "of two"
                            Insert: --two--

Column 12, Line 20          Delete: "of"

Signed and Sealed this
Sixteenth Day of August, 2011

David J. Kappos
*Director of the United States Patent and Trademark Office*

CERTIFICATE OF CORRECTION (continued)
U.S. Pat. No. 7,929,643 B2

Column 12, Line 34            Delete: "of two"
                                               Insert: --two--

Column 13, Line 49            Delete: "is it"
                                               Insert: --it is--